Figure 3:
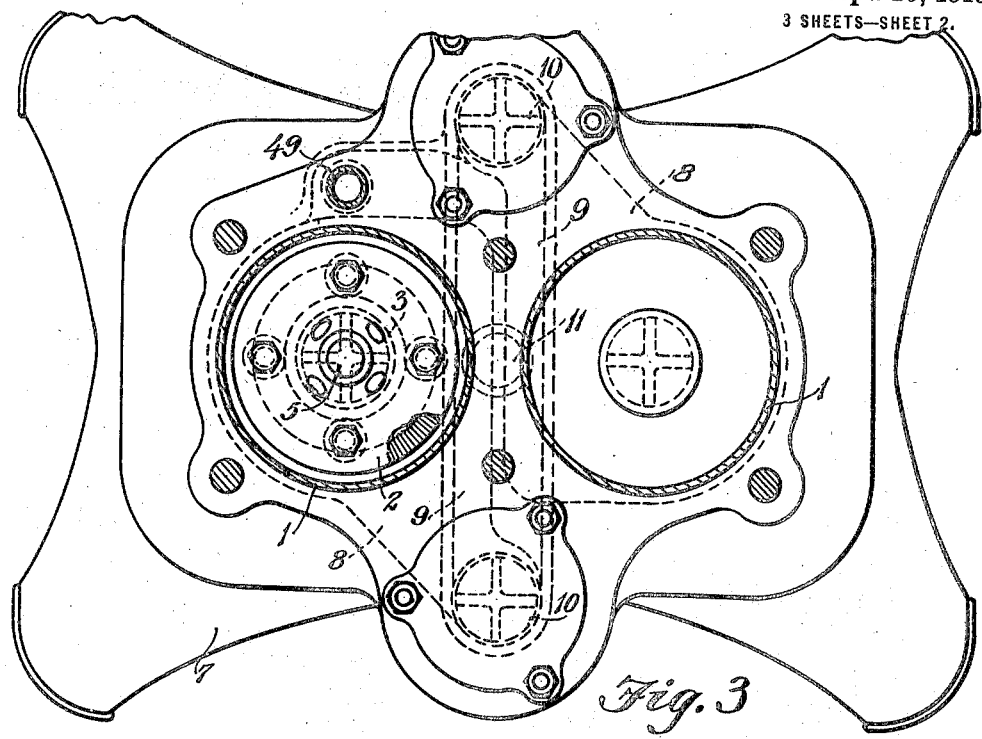

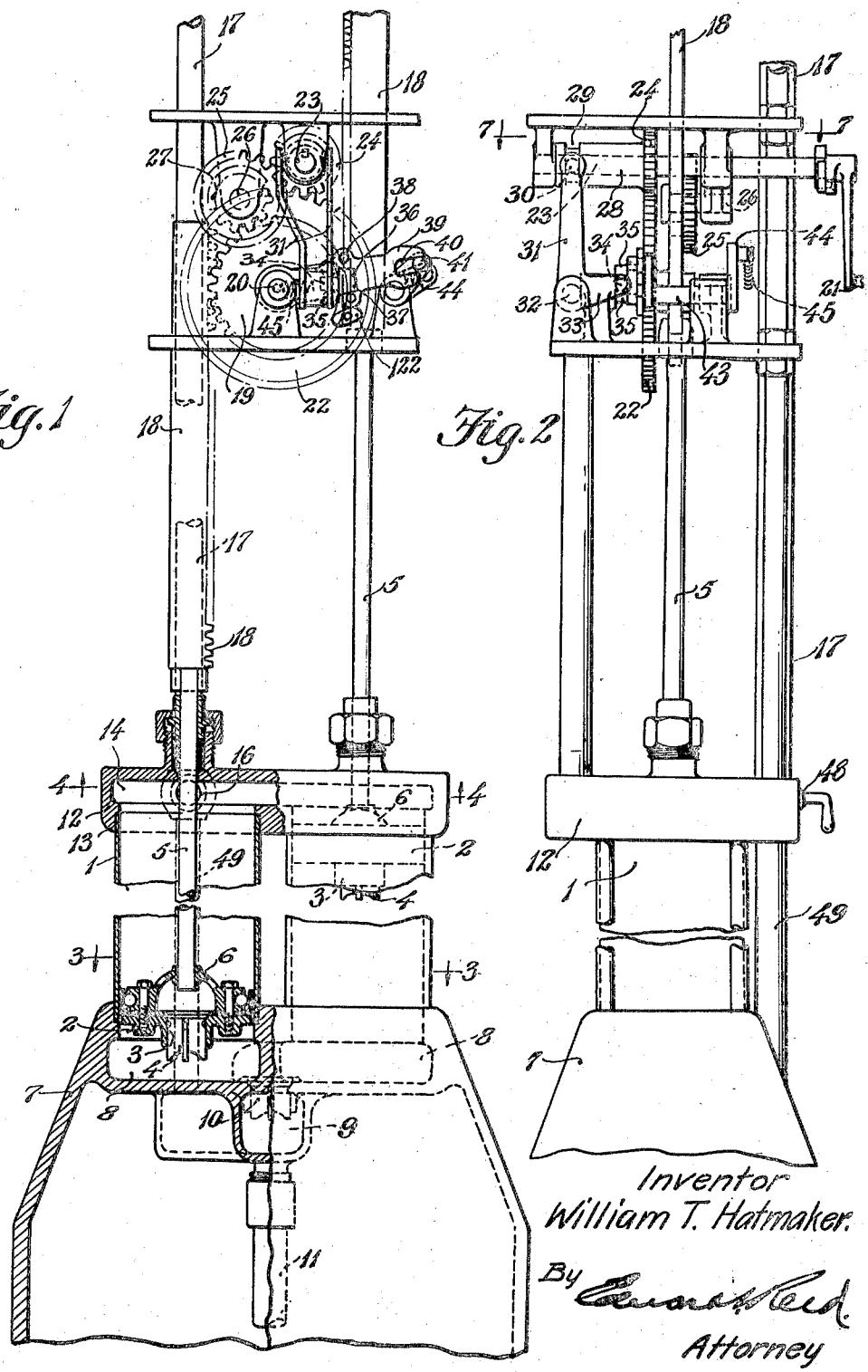

W. T. HATMAKER.
LIQUID DISPENSING PUMP.
APPLICATION FILED FEB. 27, 1919.

1,316,032.

Patented Sept. 16, 1919.
3 SHEETS—SHEET 2.

Inventor
William T. Hatmaker.
By Edward C. Reed
Attorney

W. T. HATMAKER.
LIQUID DISPENSING PUMP.
APPLICATION FILED FEB. 27, 1919.

1,316,032.

Patented Sept. 16, 1919.
3 SHEETS—SHEET 3.

Inventor
William T. Hatmaker

By
Attorney

UNITED STATES PATENT OFFICE.

WILLIAM T. HATMAKER, OF DAYTON, OHIO.

LIQUID-DISPENSING PUMP.

1,316,032. Specification of Letters Patent. Patented Sept. 16, 1919.

Application filed February 27, 1919. Serial No. 279,491.

*To all whom it may concern:*

Be it known that I, WILLIAM T. HATMAKER, a citizen of the United States, residing at Dayton, in the county of Montgomery and State of Ohio, have invented certain new and useful Improvements in Liquid-Dispensing Pumps, of which the following is a specification, reference being had therein to the accompanying drawing.

This invention relates to liquid dispensing pumps. The main object of the invention is to provide such a pump that will accurately measure the liquid and will deliver the exact measured quantity to the customer.

Much difficulty is experienced in securing accurate measurement with dispensing pumps. This is due to various reasons. It not infrequently happens that short measure is given because of the failure to cause the piston of the pump to complete its movement, in one direction or the other. Over measurement sometimes results from the inertia of the column of liquid. During the delivery stroke of the piston all the valves are open in one direction to permit of the free movement of the liquid, and if the movement of the piston is suddenly interrupted, as by coming in contact with a fixed stop, the inertia of the column of liquid will cause more or less of the same to move past the piston after it has completed its movement, and to thus enter the discharge line.

Another difficulty is encountered with those pumps which are provided with a return pipe through which the liquid in the cylinder may be returned to the supply tank, as the connection between the cylinder and return pipe will sometimes be left partly open, so that a part of the liquid which should go to the discharge pipe escapes through the return pipe.

Another difficulty encountered with pumps of this type results from the liquid being drawn through the suction line to the cylinder at such a speed as to cause a vortex or eddy within the tank and about the intake end of the suction line, which will so agitate the liquid as to loosen particles of foreign matter or sediment which may have accumulated in the tank, or in the suction line, and which will then be drawn with the liquid into the pump.

To overcome such difficulties, it is a further object of the invention to provide a double cylinder pump in which the piston will be actuated by the continuous movement of the driving member in one direction and will be reversed at the end of each stroke, thus making it necessary that each piston shall complete its stroke in each direction, and further avoiding the sudden stopping of the piston, and thus preventing the liquid from being carried past the piston by its inertia.

A further object of the invention is to provide such dispensing pumps with means whereby any liquid which remains in the cylinder above the piston, when the full quantity required by the customer has been delivered, may be returned to the supply line; and to provide means for so controlling the same that it will be impossible to connect the return pipe with the cylinder when the discharge pipe is connected therewith.

A further object of invention is to provide a pump of this character which will be simple in its construction and operation, and highly efficient in its operation.

Other objects of invention will appear as a mechanism described in detail.

Figure 4:
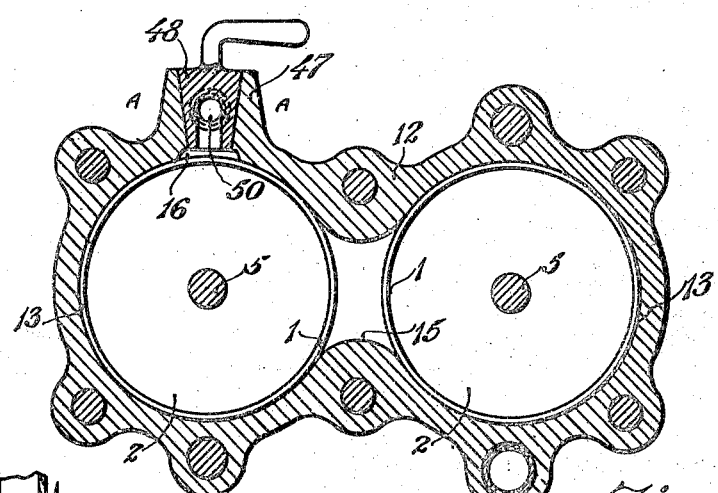
Figure 5:
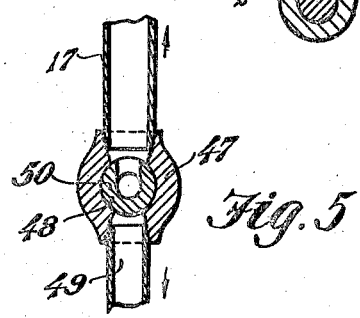
Figure 6:
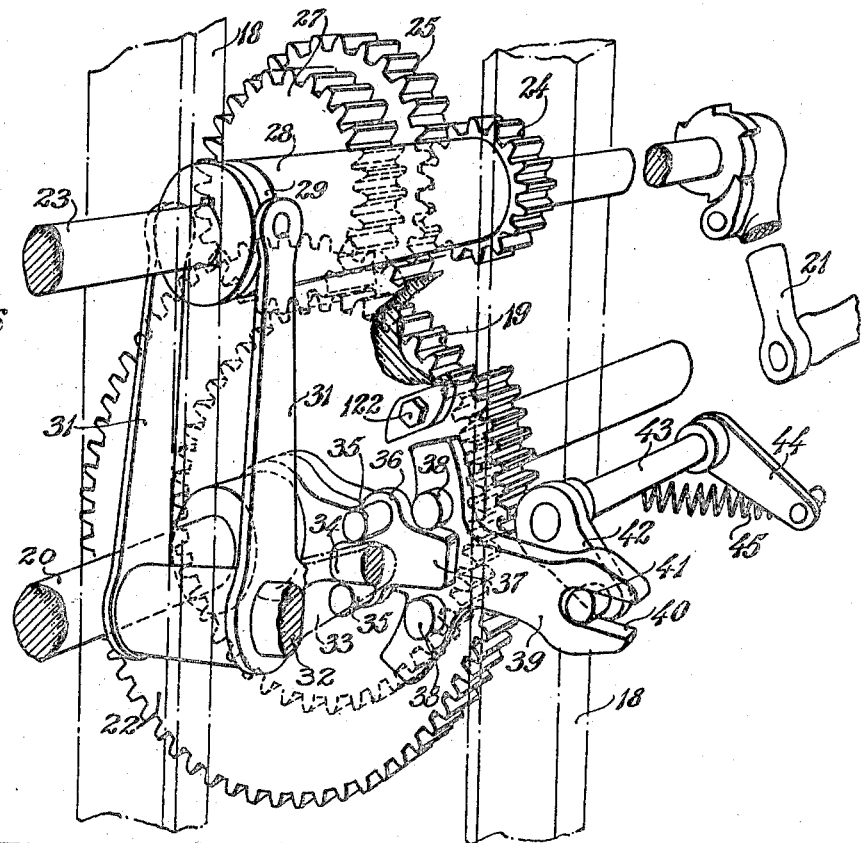
Figure 7:
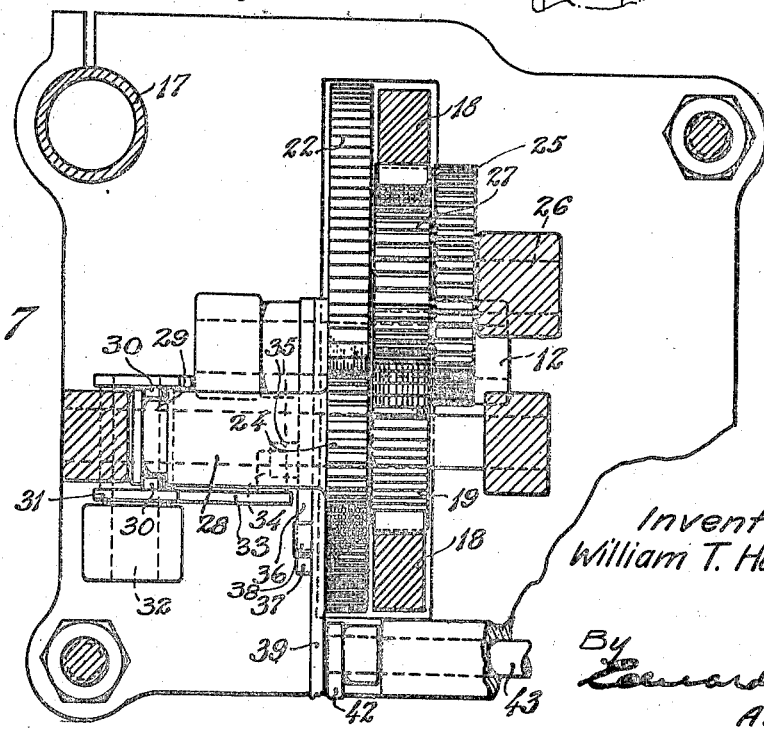

In the accompanying drawings Figure 1 is a front elevation, partly in section, of a pump embodying my invention; Fig. 2 is a side elevation of such a pump; Fig. 3 is a sectional view taken on the line 3—3 of Fig. 1; Fig. 4 is a sectional view taken on the line 4—4 of Fig. 1; Fig. 5 is a transverse sectional view of the by-pass valve; Fig. 6 is a perspective view of the piston operating mechanism; and Fig. 7 is a sectional view showing the operating mechanism in plan.

In these drawings I have illustrated one embodiment of my invention, and have shown the same as comprising two cylinders which are preferably of relatively small capacity, and the pistons of which are operated simultaneously in opposite directions by suitable operating mechanism, which mechanism is of such a character that the driving member may be driven continuously in one direction and the movements of the pistons will be automatically reversed at the end of each stroke. In this mechanism I have also shown the two cylinders as taking their supply of liquid from a common supply pipe and delivering the same through a common discharge opening and in order to permit the pistons to be returned to their initial positions, at the top and bottom of the cylinder, respectively, I have provided a valve controlled by-pass leading from the discharge opening to enable the latter to be cut off from the discharge pipe and connected with the supply line, so that the stroke of the piston may be completed and the liquid discharged from the cylinder will be returned to the supply line. The mechanism for accomplishing these results may take various forms and that here shown has been chosen only for the purpose of illustration.

In that particular embodiment of invention here illustrated I have shown the apparatus as comprising two separate pumps, each of which consists of a cylinder 1, having therein a piston 2 which is provided with a valve controlled port 3, the valve being preferably in the form of a gravity seated check valve 4 which opens upwardly. The piston is connected with a piston rod 5 by means of a yoke 6 which has an opening therethrough to permit the liquid which passes through the port 3 to enter the cylinder above the piston. The cylinder communicates with a source of liquid supply which may be of any suitable character, but is usually in the form of a tank located at some distance from the pumping apparatus and connected with the cylinder by a suitable supply line. In the present construction the two cylinders are mounted on a base 7 which forms the closure or cylinder heads for the lower ends of the cylinder, and which is provided with chambers 8 arranged in line with and forming in effect extensions of the respective cylinders. Each of these chambers communicates with a supply conduit 9 which is formed in and extends transversely to the base, and this communication is controlled by check valves 10, which open upwardly, so that each valve will open when the piston in the corresponding cylinder moves upwardly and will be seated when that piston moves downwardly. The supply conduit 9 is connected with the supply tank or other source of supply by means of a pipe 11. With the construction shown, it will be obvious that when one of the pistons moves upwardly the check valve 4 in that piston will be seated, thus causing the liquid in the cylinder above the piston to be discharged therefrom, and that the check valve 10, leading to the supply conduit, will be opened to permit the cylinder in the rear of the piston to be filled from the supply pipe 11, thus keeping the cylinder full of liquid at all times. At the same time the piston in the other cylinder will be moving downwardly and the pressure of the liquid will seat the check valve 10, leading from that cylinder to the supply conduit. Inasmuch as the liquid cannot escape from the cylinder the valve 4 in the piston of that cylinder will be opened to permit the liquid to pass through the port 3 into the upper portion of the cylinder as the piston moves downwardly, and, consequently, the cylinder will be filled with liquid at all times during the downward stroke of the piston. The liquid may be discharged from the cylinders in a suitable manner, but I prefer that they shall discharge into a single discharge pipe, and that this discharge pipe shall communicate with the two cylinders through a single discharge opening. To this end I have shown the upper ends of the cylinders as closed by a single cap or casting 12, which is provided with seats 13 to receive the upper ends of the respective cylinders, and is also provided with chambers 14 which are arranged in line with, and form in effect extensions of, the cylinders, and are connected one to the other by a passageway 15. One of these chambers is provided in its lateral wall with a discharge opening 16, with which is connected a discharge pipe 17, leading to the point of discharge. Usually this pipe is connected with a hose or other flexible conduit to facilitate the delivery of the liquid to the customer. Inasmuch as the cylinder in which the piston is moving downwardly is filled with liquid, the liquid which is discharged from the other cylinder will not enter the first mentioned cylinder but will pass through the discharge opening 16.

Each piston has connected therewith a suitable actuating device, which in the present instance is shown as rack 18, connected with and forming an extension of the piston rod. The two racks are arranged with their toothed sides adjacent one to the other and mesh with a gear 19, which is mounted on a shaft 20 carried by the frame or supporting structure of the pump. Operative movement may be imparted to the gear in any suitable manner, but it will be obvious that its movement must be reversed at the end of each stroke of the piston, and, in present construction, I have connected with the gear 19 a driving member which is here shown in the form of a crank or handle 21, by means of which operative movement may be imparted to the pistons. In order that this crank or driving member may be operated continuously in a forward direction, I have interposed between the same and the gear suitable reversing mechanism, which will be operated automatically to reverse the direction of movement of the gear 19 and, consequently, of the pistons at the end of each stroke. The reversing operation is controlled by the movement of the pistons and may be adjusted to regulate the measure, or quantity of liquid discharged from the cylinders. This reversing mechanism may take various forms, but preferably consists of two sets of gears which are alternately interposed between the crank and the gear 19. As here shown a gear 22, which is of greater diameter than the gear 19, is mounted on the shaft 20 and rigidly secured to the gear 19, so that the two gears operate in unison. Extending parallel with the shaft 20 and spaced some distance therefrom, is a driving shaft 23 on which the crank 21 is mounted. Carried by the shaft 23 is a pinion 24 which is adapted to mesh with the gear 22 and thus cause the gear 19 to be operated by the rotation of the handle. The pinion 24 is slidably mounted on the shaft 23, but is held against rotation relatively thereto. When the pinion 24 is moved along the shaft 23, to disengage it from the gear 22, it is brought into mesh with an idle gear 25, mounted on a counter shaft 26 and having secured thereto a second idle gear 27, which meshes with the gear 19. The two gears 27 and 25 being rigidly connected one to the other constitute in effect a single gear, the two parts of which are of different diameters to give the desired ratio. By interposing the idle gears between the pinion 24 and the gear 19, it will be obvious that the movement of the gear 19 will be in the direction opposite from that in which it will move when the pinion is in mesh with the gear 22, and that the shifting of the pinion 24 from one position to the other will cause the direction of movement of the gear 19 and of the pistons to be reversed. The shifting of the pinion 24 is controlled in accordance with the movement of the piston and is accomplished automatically.

In the construction here shown, the pinion 24 is mounted on an elongated hub or sleeve, 28, splined to the shaft 23 and having near one end thereof a circumferential groove 29 to receive pins 30 carried by the arms of a yoke 31, which is mounted on a shaft 32 extending transversely to the shaft 23, and constitutes one arm of a bell crank lever. A second arm 33 is also secured to the shaft 32, extends at an angle to the yoke 31, and constitutes the other arm of said bell crank lever. The free end of the arm 33 has secured thereto a pin 34 which lies between two other pins 35 rigidly secured to an arm 36, which is loosely mounted on the shaft 20, the arrangement being such that the movement of the arm 36 will rock the bell crank lever and cause the pinion 24 to be shifted. The arm 36 is provided with a portion, here shown as a forwardly projecting nose 37, which lies between two pins 38 carried by a second arm or lever 39, which is also loosely mounted on the shaft 20 and extends along side of the arm 36. A part of the lever 39 lies in the path of a trip device 122 carried by the gear 22 and adapted to engage the lever 39 on one side when the gear is moving in one direction and to engage said lever on the other side when the gear 22 is moving in the opposite direction, thus causing the arm 36 to be rocked about its axis and the pinion 24 to be shifted at the end of each stroke of the pistons.

I prefer that the construction be such that the pinion 24 will be positively moved out of mesh with the gear with which it happens to be in mesh at that time, by the power applied to the operating member or crank 21, but as soon as the pinion is disengaged from the gear other means must be provided for completing its movement into mesh with the other gear. To this end I have extended the lever 39 beyond the arm 36 and have provided therein a longitudinal slot 40, into which projects a pin 41 carried by a crank arm 42, mounted on a shaft 43, to which is also secured a second crank arm 44. Connected with the arm 44 is an actuating device which is so arranged that it will become operative when the arm 44 passes a central position. This actuating device may take various forms, but I prefer to utilize either a weight or spring and have here shown the same as comprising a spring 45 one end of which is connected with the arm 44 and the other end of which is connected with a fixed part of the structure at such a point that as the shaft 43 and arm 44 move from their initial positions the spring will be placed under tension, and as soon as the arm passes a point midway between the limits of its movement the spring will become operative and by its contraction will tend to quickly complete the movement of the arm 44 in the direction in which it has been started. The pins 38 on the lever 39 are spaced apart a distance greater than the width of the nose 37 of the arm 36, so that the lever 39 may have a certain amount of movement relatively to the arm 36. The relative movements of several parts are so timed that when the trip device on the gear 22 engages the lever 39 the lever will be moved to cause one of the pins 38 to engage the nose on the arm 36, and then the continued movement of the gear 22 will rock the arm 36 and the bell crank lever to shift the pinion out of mesh with that gear with which it is in operative relation the disengaging of the pinion being accomplished positively by the power applied to the operating crank 21. The position of the arm 44 is such that it will pass its central position just as or slightly before the pinion 24 is disengaged from the gear, and the action of the spring 45 will then complete the movement of the lever 39 and the bell crank lever to shift the pinion into mesh with the other gear and reëstablish operative connection between the operating crank and the gear 19, the connection thus established, however, being such as to cause the gear 19 to be rotated in the opposite direction. The tripping device 122 may take various forms, but it is here shown as carried by the gear 22 and is preferably adjustable. For this reason it is shown as a double nosed cam bolted to the face of the gear and adjustable about the bolt to enable it to engage the lever 39 when the gear 22 and, consequently, the pistons are in different positions, thus enabling the length of the movement imparted to the pistons to be regulated to control the amount of liquid discharged from the cylinders.

As has been stated, the delivery of the quantity of liquid required by a customer is sometimes completed before the pistons in the cylinders complete their strokes, and if the pistons are left in their intermediate positions until the next delivery is begun, it causes more or less confusion and uncertainty in this second delivery, as it is difficult to ascertain and keep track of the exact positions of the pistons. I have therefore, provided means whereby the movements of the pistons may be completed, and the surplus liquid which is thus discharged from the one cylinder will be returned to the supply line. To accomplish this, I have provided a valve controlled by-pass which extends between the discharge port 16 in the casting or cap 12 and the supply line in the base 7. In the construction shown the discharge opening 16 leads into a boss 47 which forms a valve casing and has mounted therein a plug valve 48. Connected with the boss 47, and communicating therethrough with the discharge opening 16, is the upwardly extending discharge pipe 17, and a downwardly extending by-pass pipe 49, which leads through the wall of the base 7 and is connected with the supply conduit 9. The valve 48 which controls the by-pass has, preferably, a single port, as shown at 50, a portion of which extends axially to the valve member and the other portion of which extends at an angle thereto, so that it may be moved into alinement with either the discharge pipe 17 or by-pass pipe 49. In the normal operation of the pump the valve is set to connect the discharge pipe 17 with the discharge opening 16, leading from the cylinder, but when it is desired to utilize the by-pass the valve is shifted to cut off the discharge pipe 17 and connect the by-pass with the cylinders, whereby the completion of the movements of the piston will cause the liquid which is discharged from the one cylinder to be delivered through the by-pass to the supply conduit 9 and drawn into the cylinder in the rear of the piston.

It will also be noted that the arrangement of the valve is such that it has an intermediate or neutral position in which it will interrupt communication between the cylinders and both the discharge pipe and by-pass. Consequently, it is impossible to open the by-pass until the discharge pipe is fully disconnected from the cylinder, and, further, the pumping mechanism may be thus locked against movement, because when the valve is in its neutral position, there will be no outlet for the liquid from the cylinders. It will be obvious that the arrangement of, and the manner of controlling the by-pass may take various forms and that the liquid may be returned to the supply line at various points, but the arrangement here shown, for the purpose of illustration, gives very satisfactory results.

The operation of the mechanism will be readily understood from the foregoing description of the several parts thereof, and it will be apparent that I have provided a pump which will accomplish the results above set forth in an efficient manner; which is easy of operation; and which is automatically controlled to reverse the direction of movement of pistons. It will also be apparent that the liquid will be drawn into the cylinders at relatively low speed and all tendency to overthrow will be prevented, and there will be little or no tendency to agitate the liquid in the supply tank so as to dislodge and put into circulation foreign matter. Further, it will be apparent that the operating mechanism is very simple in its construction, and that the reversing devices are of such a character that they can be adjusted to properly time the movements of the pistons, and, further, they are of such a character that the friction between the actuating levers will be reduced to a minimum and there will be little or no tendency on the part of these levers to become disarranged or to be rendered inoperative by wear or rough usage. Further, the device is of such a character that it can be produced at a relatively low cost, and the cost for maintenance will be very low.

While I have shown and described one embodiment of my invention, I wish it to be understood that I do not desire to be limited to the details of construction as various modifications will occur to a person skilled in the art.

Having now fully described my invention what I claim as new and desire to secure by Letters Patent is;

1. In a pumping apparatus, a cylinder, a piston therefor, a gear to actuate said piston, an operating device for said gear having movement continuously in one direction, and means interposed between said gear and said operating device and controlled by said gear to automatically reverse the direction of movement of said gear at the end of each stroke of said piston.

2. In a pumping apparatus, a cylinder, a piston therefor, a rack connected with said piston, a gear meshing with said rack to move said piston in opposite directions, an operating device to actuate said gear, and reversing mechanism interposed between said operating device and said gear and controlled by said gear to automatically reverse the direction of movement of said gear while said operating device moves continuously in one direction.

3. In a pumping apparatus, a cylinder, a piston therefor and rack connected with said piston, a gear meshing with said rack, an operating device for said gear, a pinion connected with said operating device, two sets of intermediate gearing to connect said pinion with the first mentioned gear, a means for automatically shifting said pinion into operative relation with either set of gearing.

4. In a pumping apparatus, a cylinder, a piston therefor, a rack connected with said piston, a gear meshing with said rack, an operating device for said gear, a pinion connected with said operating device, two sets of intermediate gearing to connect said pinion with the first mentioned gear, and means for automatically imparting axial movement to said pinion to shift the same into operative relation with either set of gearing.

5. In a pumping apparatus, the combination with a cylinder and a piston therefor, of a gear operatively connected with said piston to move the same in opposite directions, a second gear secured to the first mentioned gear, an idle gear connected with the first said mentioned gear, a pinion adapted to mesh with either said second gear or said idle gear, means for rotating said pinion, and means for automatically shifting said pinion from one position to the other.

6. In a pumping apparatus, the combination with a cylinder and a piston therefor, of a gear operatively connected with said piston to move the same in opposite directions, gear trains for moving said gear in opposite directions, a pinion adapted to be moved into mesh with either of said gear trains, means for rotating said pinion and means controlled by the rotation of said gear for automatically shifting said pinion from one gear train to the other.

7. In a pumping apparatus, the combination with a cylinder and a piston therefor, of a gear connected with said piston to move it in opposite directions, two sets of gearing connected with the first mentioned gear to rotate the same in opposite directions, a pinion movable into mesh with either set of gearing, means for rotating said pinion, an actuating lever connected with said pinion, and means controlled by the rotation of the first mentioned gear to actuate said lever.

8. In an apparatus of the character described, pumping mechanism, actuating devices therefor comprising two gear trains, a pinion movable into mesh with either of said gear trains, means for rotating said pinion, and means for automatically shifting said pinion from one gear train to the other.

9. In an apparatus of the character described, pumping mechanism, actuating devices for said pumping mechanism comprising two trains of gearing, a pinion movable into mesh with either train of gearing, means for rotating said pinion, a lever connected with said piston to move the same from one position to the other, and means controlled by the position of said actuating devices to rock said lever and shift said pinion from one position to the other.

10. In an apparatus of the character described, pumping mechanism, actuating devices therefor comprising a gear, a second gear connected with the first mentioned gear, an idle gear meshing with the said first mentioned gear, a pinion movable into mesh with either said second gear or said idle gear, means for rotating said pinion, a lever connected with said pinion for shifting it from one position to the other, a second lever connected with the first mentioned lever, and means carried by the first mentioned gear to impart movement to said second lever to operate first mentioned lever and thus shift said pinion from one position to the other.

11. In an apparatus of the character described, pumping devices, actuating mechanism for said pumping devices comprising a gear, a pinion adapted to mesh with said gear, an idle gear connected with the first mentioned gear, and arranged to be engaged by said pinion when the latter is out of mesh with the first mentioned gear, means for rotating said pinion, and means for automatically shifting said pinion from one position to the other.

12. In an apparatus of the character described, pumping devices, actuating mechanism for said pumping devices comprising a gear, a pinion adapted to mesh with said gear, an idle gear connected with the first mentioned gear and arranged to be engaged by said pinion when the latter is out of mesh with the first mentioned gear, means for rotating said pinion, and means controlled by the rotation of the first mentioned gear to shift said pinion from one position to the other.

13. In an apparatus of the character described, pumping devices, actuating mechanism for said pumping devices, comprising a gear, a pinion adapted to mesh with said gear, an idle gear connected with the first mentioned gear and arranged to be engaged by said pinion when the latter is out of mesh with the first mentioned gear, means for rotating said pinion, a lever connected with said pinion to shift the same from one position to the other, an arm connected with said lever, and a part carried by said gear to actuate said arm.

14. In an apparatus of the character described, pumping devices, actuating mechanism for said pumping devices comprising a gear, a pinion adapted to mesh with said gear, an idler gear connected with the first mentioned gear and arranged to be engaged by said pinion when the latter is out of mesh with the first mentioned gear, means for rotating said pinion, a bell crank lever having one arm connected with said pinion, a second lever pivotally mounted on the axis of said gear and having operative connection with the other arm of said bell crank lever, and means for actuating said second lever.

15. In an apparatus of the character described, pumping devices, actuating mechanism for said pumping devices comprising a gear, a pinion adapted to mesh with said gear, an idle gear connected with the first mentioned gear and arranged to be engaged by said pinion when the latter is out of mesh with the first mentioned gear, means for rotating said pinion, a bell crank lever having one arm connected with said pinion to shift the same from one position to the other, a second lever operatively mounted adjacent to said gear and having operative connection with the other arm of said bell crank lever, and a tripping device carried by said gear and adapted to engage said second lever to cause said pinion to be shifted.

16. In an apparatus of the character described, pumping devices, actuating mechanism for said pumping devices comprising a gear, a shiftable pinion adapted to mesh with said gear, an idler gear connected with the first mentioned gear and arranged to be engaged by said pinion when the latter is out of mesh with the first mentioned gear, means for rotating said pinion, means for shifting said pinion comprising a spring, and means actuated by said gear to place said spring under tension.

17. In an apparatus of the character described, pumping devices, actuating mechanism for said pumping devices comprising a gear, a pinion adapted to mesh with said gear, an idle gear connected with the first mentioned gear and arranged to be engaged by said pinion when the latter is out of mesh with the first mentioned gear, means for rotating said pinion, means driven by said gearing to impart initial shifting movement to said pinion, and other means to complete the movement of said pinion.

18. In an apparatus of the character described, pumping devices, actuating mechanism for said pumping devices comprising a gear, a pinion adapted to mesh with said gear, an idle gear connected with the first mentioned gear and arranged to be engaged by said pinion when the latter is out of mesh with the first mentioned gear, means for rotating said pinion, means actuated by said gear for moving said pinion out of engagement with the gear with which it is then in mesh, and other means for moving said pinion into mesh with the other gear.

19. In an apparatus of the character described, pumping devices, actuating mechanism for said pumping devices comprising a gear, a pinion adapted to mesh with said gear, an idle gear connected with the first mentioned gear and arranged to be engaged by said pinion when the latter is out of mesh with the first mentioned gear, means for rotating said pinion, a lever connected with said pinion to shift the same from one position to the other, positively actuated means to impart initial movement to said lever, and a spring to complete the movement of said lever.

20. In an apparatus of the character described, pumping devices, actuating mechanism for said pumping devices comprising a gear, a pinion adapted to mesh with said gear, an idle gear connected with the first mentioned gear and arranged to be engaged by said pinion when the latter is out of mesh with the first mentioned gear, means for rotating said pinion, a lever connected with said pinion to shift the same from one position to the other, means actuated by said gear to impart movement to said lever, a rock arm connected with said lever, and a spring connected with said rock arm and arranged to be operative after said rock arm passes a predetermined point, whereby said spring will complete the movement of said lever.

21. In an apparatus of the character described, pumping devices, actuating mechanism for said pumping devices comprising a gear, a pinion adapted to mesh with said gear, an idle gear connected with the first mentioned gear and arranged to be engaged by said pinion when the latter is out of mesh with the first mentioned gear, means for rotating said pinion, a lever connected with said pinion to shift the same from one position to the other, a second lever connected with the first mentioned lever, a part connected with said gear to impart initial movement to said second lever, a crank arm connected with said second lever, and a spring connected with said crank arm and arranged to be placed under greatest tension when said crank arm is in intermediate position, whereby the movement to said crank arm past said intermediate position will render said spring operative.

22. In an apparatus of the character described, pumping devices, actuating mechanism for said pumping devices comprising a gear, a pinion adapted to mesh with said gear, an idle gear connected with the first mentioned gear and arranged to be engaged by said pinion when the latter is out of mesh with the first mentioned gear, means for rotating said pinion, a lever having one arm connected with said pinion, an arm pivotally mounted on the axis of said gear and connected with the other arm of said bell crank lever, a second lever also mounted on the axis of said gear and having parts adapted to engage and actuate said arm when said second lever is moved in either direction, a means carried by said gear for actuating said second lever.

23. In an apparatus of the character described, pumping devices, actuating mechanism for said pumping devices comprising a gear, a pinion adapted to mesh with said gear, an idle gear connected with the first mentioned gear and arranged to be engaged by said pinion when the latter is out of mesh with the first mentioned gear, means for rotating said pinion, a lever pivotally mounted between its ends on an axis extending transversely to the axis of said pinion and having one arm connected with said pinion, a second lever pivotally mounted on an axis parallel to the axis of said pinion and having connection with the first mentioned lever, and means controlled by said actuating mechanism for imparting movement to said second lever.

24. In an apparatus of the character described, pumping devices, actuating mechanism for said pumping devices comprising a gear, a pinion adapted to mesh with said gear, an idle gear connected with the first mentioned gear and arranged to be engaged by said pinion when the latter is out of mesh with the first mentioned gear, means for rotating said pinion, a lever pivotally mounted between its ends on an axis extending transversely to the axis of said pinion and having one arm connected with said pinion, a second lever pivotally mounted on an axis parallel to the axis of said pinion and operatively connected with the other arm of said first mentioned lever, means actuated by said actuating mechanism for imparting initial movement to said second lever, and other means for completing the movement of said second lever.

25. In an apparatus of the character described, pumping devices, actuating mechanism for said pumping devices comprising a gear, a pinion adapted to mesh with said gear, an idle gear connected with the first mentioned gear and arranged to be engaged by said pinion when the latter is out of mesh with the first mentioned gear, means for rotating said pinion, a lever connected with said pinion, a second lever having connection with the first mentioned lever and capable of a limited movement relatively thereto, and means controlled by said actuating mechanism for imparting movement of the said second lever.

26. In an apparatus of the character described, pumping devices, actuating mechanism for said pumping devices comprising a gear, a pinion adapted to mesh with said gear, an idle gear connected with the first mentioned gear and arranged to be engaged by said pinion when the latter is out of mesh with the first mentioned gear, means for rotating said pinion, a lever pivotally mounted between its ends on an axis extending transversely to the axis of said pinion and having one end connected with said pinion, an arm pivotally mounted on the axis of said gear and having operative connection with the other arm of said lever, a second lever pivotally mounted on said axis of said gear and connected with said arm, a part carried by said gear for imparting initial movement to said second lever, a crank arm connected with said second lever, and a spring connected with said crank arm and arranged to complete the movement of said second lever.

27. In an apparatus of the character described, pumping devices, actuating mechanism for said pumping devices comprising a gear, a pinion adapted to mesh with said gear, an idle gear connected with the first mentioned gear and arranged to be engaged by said pinion when the latter is out of mesh with the first mentioned gear, means for rotating said pinion, and adjustable means controlled by said actuating mechanism for shifting said pinion from one position to the other.

28. In an apparatus of the character described, pumping devices, actuating mechanism for said pumping devices comprising a gear, a pinion adapted to mesh with said gear, an idle gear connected with the first mentioned gear, and arranged to be engaged by said pinion when the latter is out of mesh with the first mentioned gear, means for rotating said pinion, a lever connected with said pinion for shifting the same from one position to the other, a second lever operatively connected with the first mentioned lever, and a part carried by said gear to engage said second lever and cause said pinion to be shifted, said part being adjustable to vary the point of contact with said second lever.

29. In a pumping apparatus two pumps each comprising a cylinder and a piston therefor, racks connected with said pistons, a gear meshing with said racks, an operating device for said gear, and a pinion connected with said operating device, two sets of intermediate gears to connect said pinion with the first mentioned gear, and means for shifting said pinion into operative relation with either set of gearing.

In testimony whereof, I affix my signature hereto.

WILLIAM T. HATMAKER.